United States Patent
Vermeulen et al.

(10) Patent No.: US 8,701,368 B2
(45) Date of Patent: Apr. 22, 2014

(54) SET OF PANELS

(75) Inventors: Bruno Paul Louis Vermeulen, Aldeneik-Maaseik (BE); Jan Eddy De Rick, Geraardsbergen (BE)

(73) Assignee: Spanolux N.V. -Div, Balterio, Sint-Baafs-Vijve (BE)

( * ) Notice: Subject to any disclaimer, the term of this patent is extended or adjusted under 35 U.S.C. 154(b) by 0 days.

(21) Appl. No.: 13/258,736

(22) PCT Filed: Mar. 25, 2010

(86) PCT No.: PCT/EP2010/053911
§ 371 (c)(1),
(2), (4) Date: Nov. 2, 2011

(87) PCT Pub. No.: WO2010/108980
PCT Pub. Date: Sep. 30, 2010

(65) Prior Publication Data
US 2012/0042598 A1 Feb. 23, 2012

(30) Foreign Application Priority Data
Mar. 25, 2009 (EP) .................................. 09156106

(51) Int. Cl.
*E04B 2/00* (2006.01)
(52) U.S. Cl.
USPC ........................................ 52/586.2; 52/592.1
(58) Field of Classification Search
USPC ............ 52/588.1, 582.2, 585.1, 589.1, 590.2, 52/590.3, 591.3, 591.5, 309.1, 582.1, 52/586.1, 586.2, 591.1, 592.1; 403/364
See application file for complete search history.

(56) References Cited

U.S. PATENT DOCUMENTS 7,454,875 B2 * 11/2008 Pervan et al. ................ 52/586.2
7,802,411 B2 *  9/2010 Pervan et al. ................ 52/586.2

(Continued)

FOREIGN PATENT DOCUMENTS

EP    1650375    4/2006
EP    2017403    1/2009

(Continued)

OTHER PUBLICATIONS

Official Search Report and Written Opinion of the European Patent Office Patent Office in counterpart foreign application No. PCT/EP2010/053911 filed Mar. 25, 2010.

*Primary Examiner* — Jeanette E Chapman
*Assistant Examiner* — James Buckle, Jr.
(74) *Attorney, Agent, or Firm* — Steven M. Koehler; Westman, Champlin & Koehler, P.A.

(57) ABSTRACT

A set of panels comprises a first panel having a first edge including an undercut which accommodates a fastening member, and a second panel having a second edge including a locking region. The first and second edges are positioned adjacent to each other when the panels are fastened to each other by means of the fastening member. The fastening member comprises a displaceable activating portion and a locking portion which is displaceable with respect to the first panel upon displacement of the activating portion in opposite direction of the displacement of the activating portion such that the locking portion engages the locking region of the second panel when the panels are fastened to each other by means of the fastening member. The activating portion is intended to be contacted by the second panel upon moving the second panel and the first panel with respect to each other to a fastened condition and the locking portion is intended to fasten the first and second panels with respect to each other at least perpendicularly to the direction of displacement of the locking portion. The activating portion is spaced from the locking portion in a direction substantially parallel to the first edge.

8 Claims, 14 Drawing Sheets

(56) References Cited

U.S. PATENT DOCUMENTS

| | | | |
|---|---|---|---|
| 7,841,144 B2* | 11/2010 | Pervan | 52/395 |
| 7,866,110 B2* | 1/2011 | Pervan | 52/586.2 |
| 7,908,815 B2* | 3/2011 | Pervan et al. | 52/582.1 |
| 8,042,311 B2* | 10/2011 | Pervan et al. | 52/586.1 |
| 8,112,967 B2* | 2/2012 | Pervan et al. | 52/747.11 |
| 2007/0006543 A1 | 1/2007 | Engstrom | |
| 2008/0004038 A1 | 1/2008 | Dunko | |
| 2008/0066415 A1* | 3/2008 | Pervan et al. | 52/588.1 |
| 2008/0110125 A1* | 5/2008 | Pervan | 52/582.2 |
| 2008/0134607 A1* | 6/2008 | Pervan et al. | 52/395 |
| 2008/0134613 A1 | 6/2008 | Pervan | |
| 2008/0134614 A1* | 6/2008 | Pervan et al. | 52/588.1 |
| 2008/0155930 A1* | 7/2008 | Pervan et al. | 52/588.1 |
| 2008/0295432 A1 | 12/2008 | Pervan et al. | |
| 2009/0019806 A1 | 1/2009 | Muehlebach | |
| 2009/0100782 A1 | 4/2009 | Groeke | |
| 2011/0030303 A1* | 2/2011 | Pervan et al. | 52/582.1 |

FOREIGN PATENT DOCUMENTS

| EP | 2034106 | 3/2009 |
|---|---|---|
| WO | WO 2007/008139 | 1/2007 |
| WO | WO 2008/004960 | 1/2008 |
| WO | WO 2008/017301 | 2/2008 |
| WO | WO 2009/116926 | 9/2009 |

* cited by examiner

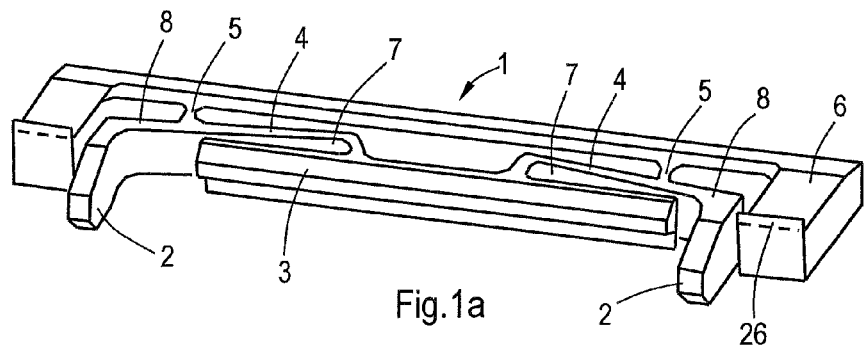
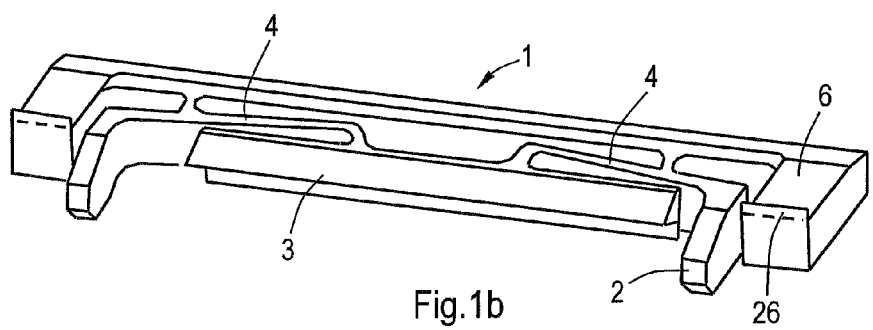
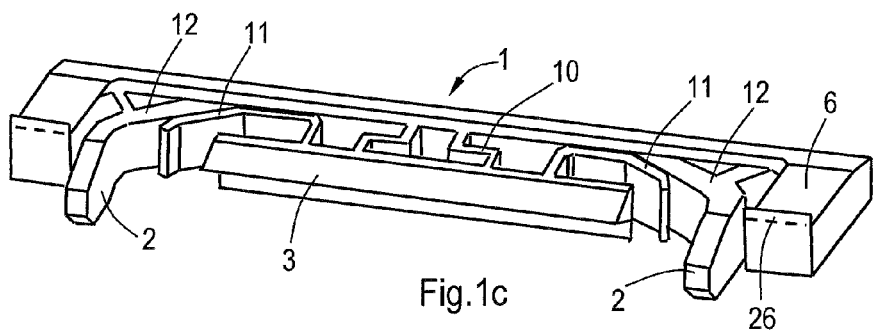

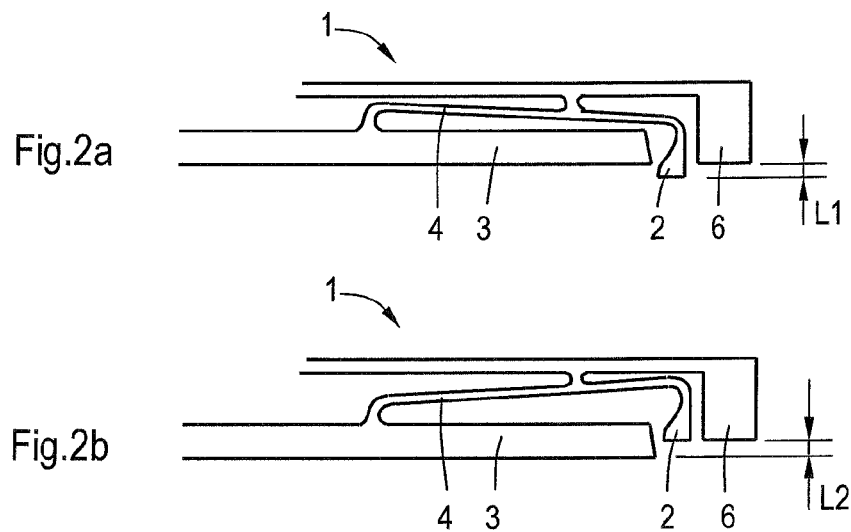
Fig.2a
Fig.2b
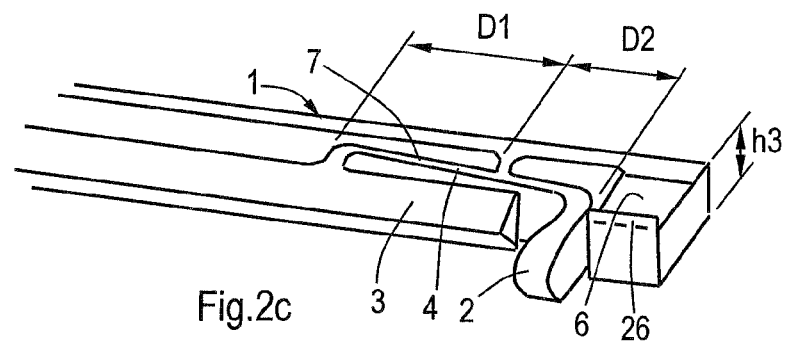
Fig.2c
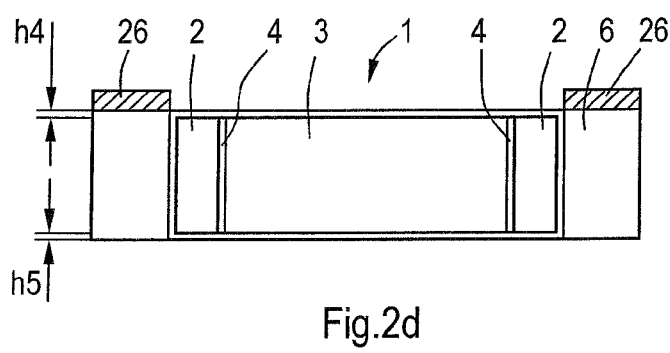
Fig.2d

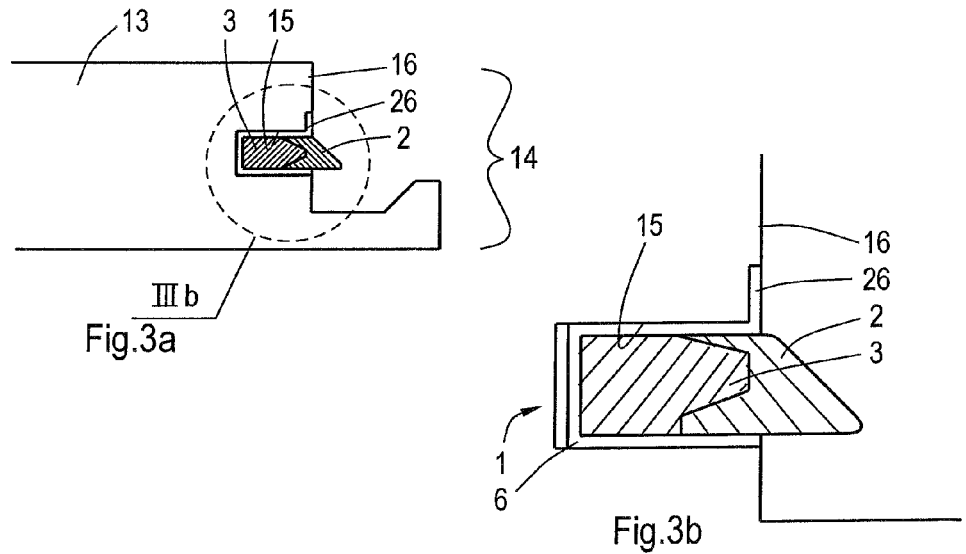
Fig.3a
Fig.3b
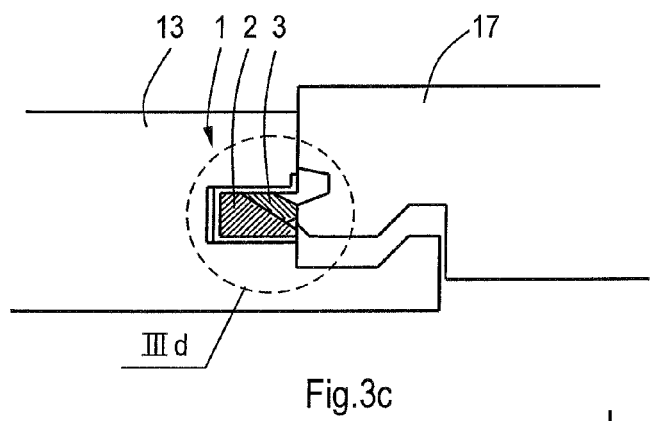
Fig.3c
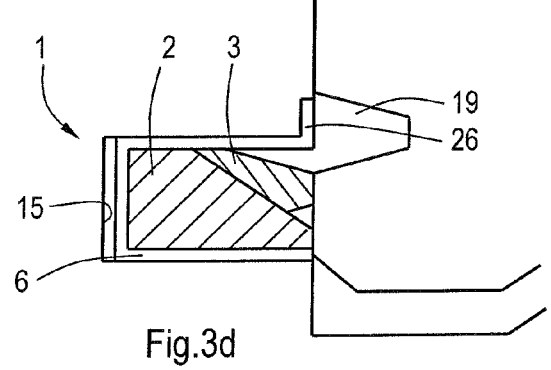
Fig.3d

SET OF PANELS

CROSS-REFERENCE TO RELATED APPLICATION

This application is a Section 371 National Stage Application of International Application PCT/EP2010/053911 filed Mar. 25, 2010 and published as WO/2010/108980 in English.

BACKGROUND

The discussion below is merely provided for general background information and is not intended to be used as an aid in determining the scope of the claimed subject matter.

Aspects of the present invention relate to a set of panels, comprising a first panel having a first edge including an undercut which accommodates a fastening member, a second panel having a second edge including a locking region, wherein the first and second edges are positioned adjacent to each other when the panels are fastened to each other by means of the fastening member.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is a set of panels including an improved fastening member.

For this purpose the fastening member comprises a displaceable activating portion and a locking portion which is displaceable with respect to the first panel upon displacement of the activating portion in opposite direction of the displacement of the activating portion such that the locking portion engages the locking region of the second panel when the panels are fastened to each other by means of the fastening member, wherein the activating portion is intended to be contacted by the second panel upon moving the second panel and the first panel with respect to each other to a fastened condition and wherein the locking portion is intended to fasten the first and second panels with respect to each other at least perpendicularly to the direction of displacement of the locking portion, and wherein the activating portion is spaced from the locking portion in a direction substantially parallel to the first edge.

This minimizes the required space for the locking portion and the activating portion in a direction transversely to the direction of displacement of the locking portion. This means that when the direction of displacement of the locking portion is parallel to an upper face of the first panel the thickness of the first panel can be minimized. In practice the first panel may lay on the ground and the second panel may be moved downwardly, for example by a folding-down movement, to be fastened to the first panel such that in the fastened condition the panels form a continuous horizontal part of a flooring. In this case, the activating portion is intended to be contacted by the second panel upon moving down the second panel with respect to the first panel and the locking portion is intended to fasten the first and second panels with respect to each other at least perpendicularly to an upper face of the panels. It is noted that the activating portion and the locking portion may be separate pieces that spaced from each other in a direction substantially parallel to the first edge.

During the locking operation the activating portion and the locking portion move in opposite directions. In a practical situation, when fastening the second panel to the first panel already laying on the ground, this may mean that the direction of displacement of the activating portion has a horizontal component directed from the second panel to the first panel, whereas the direction of displacement of the locking portion has a horizontal component directed from the first panel to the second panel.

The activating portion and the locking portion may at least partially overlap each other as seen along the first edge. In practice, when the first panel lays on the ground and the undercut extends horizontally the activation portion and the locking portion lie behind each other as seen along the first edge and intersect a common horizontal plane.

In a specific embodiment, the locking portion is displaceable in a direction substantially parallel to the upper face of the first panel and substantially perpendicular to the first edge.

The locking portion may be displaceable with respect to the first panel by means of rotation about a pivoting axis upon displacement of the activating portion, wherein the pivoting axis extends transversely with respect to an upper face of the first panel. In practice the pivoting axis extends substantially perpendicularly to the upper face of the first panel.

Furthermore, the activating portion may be displaceable with respect to the first panel by means of rotation.

In a practical embodiment the fastening member comprises a lever which is pivotable about the pivoting axis, wherein the locking portion and the activating portion are provided on the lever at opposite sides of the pivoting axis. This means that the activating portion and the locking portion are displaceable in opposite directions, whereas they are displaceable in the same rotational direction about the pivoting axis. In one embodiment, the distance between the activating portion and the locking portion is relatively small so as to avoid that the locking portion is displaced below the second panel when the second edge is tilted within a vertical plane and moved downwards with respect to the first panel towards a position parallel to the first edge, i.e. a folding down movement. The distance between the activating portion and the locking portion may be smaller than the length of the lever, for example.

In an alternative embodiment the fastening member comprises a lever and the activating portion is provided on the lever at a distance from the pivoting axis, and an opposite portion of the lever slidably contacts the locking portion which locking portion is translatably connected to the first panel. This means that upon displacement of the activation portion the lever will rotate and push against the locking portion whereas internal stress due to the translation of the locking portion and the rotation of the activating portion is avoided by means of the mentioned slidable contact.

In another embodiment the fastening member comprises a resiliency for temporarily building up a spring force on the locking portion upon displacement of the activating portion. Building-up of a spring force may occur upon temporarily holding the locking portion. For example, in case of a lever this may be flexible or in case where the locking portion is translatably connected to the first panel this may be resiliently connected thereto. The advantage of such a resiliency is that during moving down the second panel with respect to the first panel the activating portion will be displaced, but it is possible that at this stage the locking portion and the locking region still do not have such a relative position that they can engage to each other. In this period of time a spring force can be built-up such that upon reaching the desired relative position the locking portion can engage the locking region quickly.

Some frictional forces are avoided in the set of panels herein described. In the set of panels herein described the locking portion is displaced actively from the first panel to the second panel upon activating the activating portion, whereas some prior art systems the locking portion is first moved into the first panel and then moved back from the first panel in the direction of the second panel due to a spring force. This increases the risk that the flexible tongue may get stuck in the sliding groove.

BRIEF DESCRIPTION OF THE DRAWING

Aspects of the invention will hereafter be elucidated with reference to the very schematic drawings showing embodiments of the invention by way of example.

FIGS. 1a-1f are perspective views of different embodiments of fastening members of the set of panels.

FIGS. 2a-2b are plan views of a part of the embodiment according to FIG. 1a in non-activated condition and activated condition, respectively; FIG. 2c is a perspective view of a part of the embodiment of FIG. 1 for illustrating dimensions of the fastening member and FIG. 2d is a front view of a part of the fastening member.

FIGS. 3a-3f are cross-sectional views of a portion of the set of panels, illustrating different steps during a fastening process of two panels.

DETAILED DESCRIPTION OF THE ILLUSTRATIVE EMBODIMENT

Figure 1D:
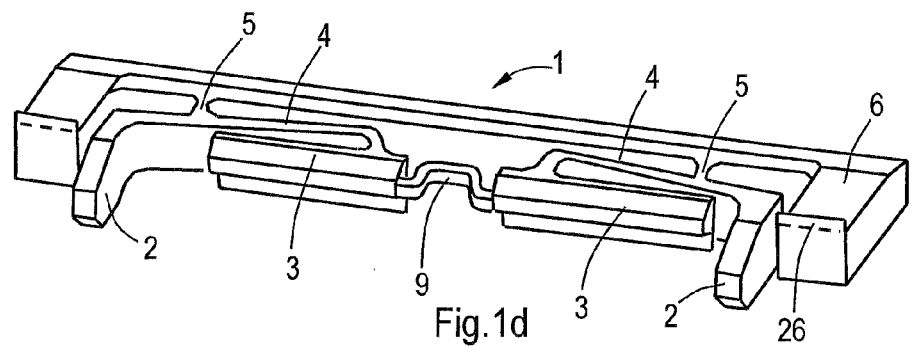

FIG. 1a shows an embodiment of a fastening member 1 of a set of panels. The fastening member 1 comprises two activating portions 2 and a locking portion 3. The locking portion 3 and the activating portions 2 are parts of levers 4. The locking portion 3 is fixed to both levers 4 at one side of respective pivots 5 of the levers 4, whereas the activating portions 2 are provided at the opposite sides of the pivots 5. Each pivot 5 includes a pivoting axis which extends substantially perpendicularly to a plane within which the locking portion 3 and the activating portions 2 are displaceable. Both the activating portions 2 and the locking portion 3 are displaceable with respect to a base portion 6 of the fastening member 1. Due to the levers 4 the locking portion 3 is displaced about the pivoting axes upon displacement of the activating portions 2. The direction of displacement of the locking portion 3 on the one hand and the activating portions 2 on the other hand are substantially opposite with respect to each other. The fastening member 1 may be made of an elastic material, for example a plastic such as a thermoplastic or thermosetting material. Alternatively, the fastening member 1 may be made of a metal.

The levers 4 of the embodiment according to FIG. 1a are adapted such that a displacement of the locking portion 3 is larger than displacements of the activating portions 2 upon rotation of the levers 4 at a certain angle. As can be seen in FIG. 1a each of two first lever legs 7 directly connected to the locking portion 3 are longer than each of second lever legs 8 directly connected to the activating portions 2. If desired, levers 4 having other dimensions can be applied easily since they extend in longitudinal direction of the fastening member 1 between the locking portion 3 and the base portion 6.

The fastening member 1 as shown in FIG. 1a comprises parallel pivoting axes, whereas the locking portion 3 forms a single piece, which is fixed to both first lever legs 7. Since both first lever legs 7 are movable in opposite rotational directions, this means that parts of the locking portion 3 are moved towards each other or away from each other in a direction parallel to a line through both pivoting axes. In order to avoid possible internal friction the locking portion 3 may be provided with a resilient element 9 between the pivoting axes. This is shown in the embodiment according to FIG. 1d.

Alternatively, the fastening member 1 may be provided with sliding pivots as shown in FIG. 1c. In this embodiment the locking portion 3 is displaceably mounted to the base portion 6 through a spring 10, and press parts 11 of the locking portion 3 are in free contact with levers 12 which are directly connected to the activating portions 2 and mounted to a back side of the base portion 6. When displacing the activating portions 2 to the base portion 6 the levers 12 press against the press parts 11 of the locking portion 3 by pressing against the base portion 6 at the same time. Due to the free contacts between the press parts 11 and the levers 12 internal stress within the locking portion 3 is avoided. Also in this embodiment the locking portion 3 is moved in opposite direction of the activating portions 2 upon activating the activating portions 2. The shape of a portion of the lever 12 which is in free contact with the base portion 6 as well as the shape of a portion of the lever 12 which is in free contact with the press parts 11 can be adapted so as to influence the transmission ratio between the mutual displacements of the locking portion 3 and the activating portions 2. The portions of the levers 12 which are in free contact with the base portion 6 and the press parts 11 rotate and translate with respect to the base portion 6 such that sliding pivoting axes are created.

Figure 1E:
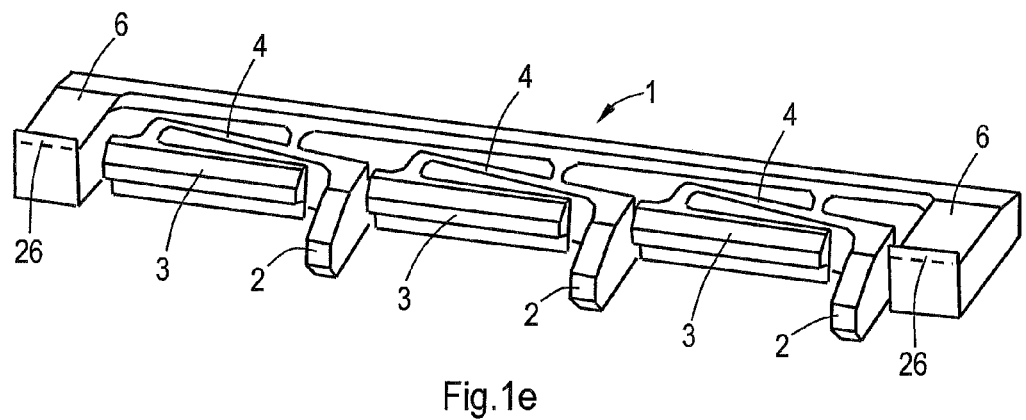

FIG. 1e shows an alternative embodiment of the fastening member 1 having three levers 4, three activating portions 2 and three locking portions 3.

Figure 1F:
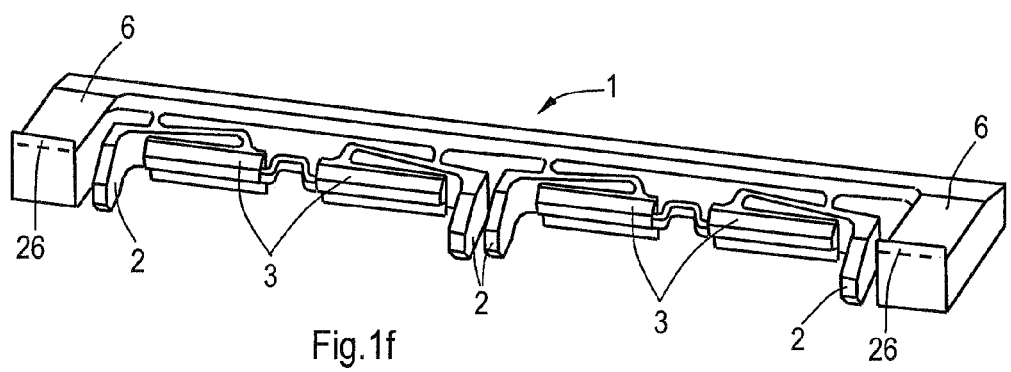

FIG. 1f shows an alternative embodiment of the fastening member 1 having two pairs of a combination of two activating portions 2 and a locking portion 3 as shown in the embodiment of FIG. 1d, arranged in series. Of course numerous alternative configurations are conceivable.

The locking portion 3 of the embodiment as shown in FIG. 1b has an inclined lower surface which is steeper than that of FIG. 1a for easily decoupling two panels in which the fastening member 1 is mounted, which will be explained hereinafter.

Figure 13:
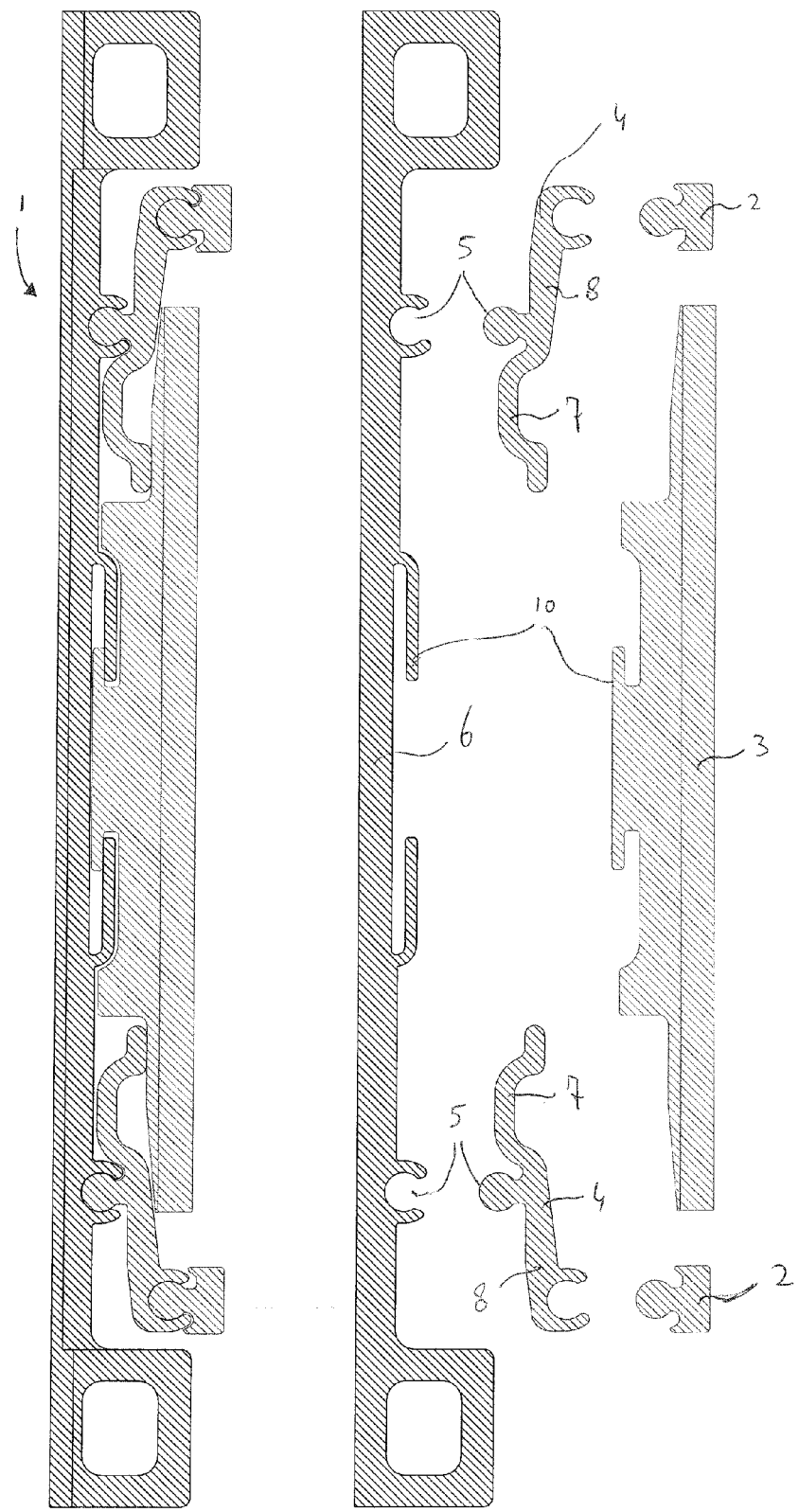
FIG. 13 is a plan view and an exploded plan view of an alternative embodiment of the fastening member.

FIG. 13 shows an alternative embodiment of the fastening member 1. In this embodiment the activating portions 2, the locking portion 3, the levers 4 and the base portion 6 are separate parts. It is shown that the levers 4 slidably contact the locking portion 3, whereas the locking portion 3 is translatably connected to the base portion 6. Similar reference signs as used for the other embodiments as described hereinbefore are used for corresponding parts in the embodiment according to FIG. 13.

FIGS. 2a-b illustrate the functioning of the mechanism of an embodiment of the fastening member 1. FIG. 2a shows a part of the embodiment according to FIG. 1a in a non-activated condition and FIG. 2b shows it in an activated condition. It can be seen that due to the lever 4 upon displacement of the activating member 2 in one direction the locking member 3 is displaced in opposite direction. FIG. 2c shows that a length D1 of the first lever leg 7 is longer than a length D2 of the second lever leg 8. The effect of this is shown in FIGS. 2a-b, illustrating a larger displacement L2 of the locking portion 3 than the displacement L1 of the activating portion 2.

Figure 3E:
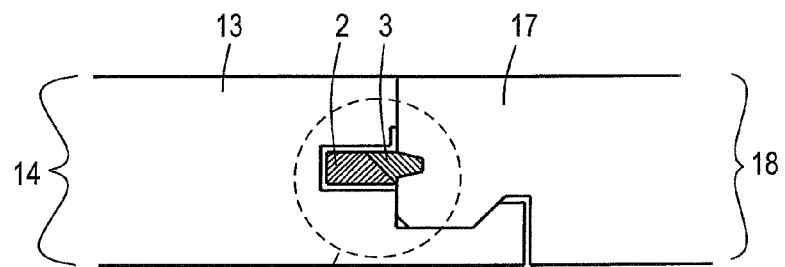

FIGS. 3a-f show the operation of fastening the set of panels to each other using one of the embodiments of the fastening member 1 as described hereinbefore. FIGS. 3a-b show cross-sectional views of a first panel 13 having a first edge 14. The first edge 14 extends between an upper face and lower face of the first panel 13. The first panel 13 can be used as a floor panel and may be a laminated panel having a core of wood-based material, but alternative materials are conceivable, for example a panel of wood, stone, ceramic, vinyl, WPC, LVT. A laminate may be based on HPL, DPL or CPL. A decorative laminate layer on the panel may be arranged by direct pressing, foils, digital pressing, and a top layer may comprise a lacquer or a hot coating or the like.

Figure 3F:
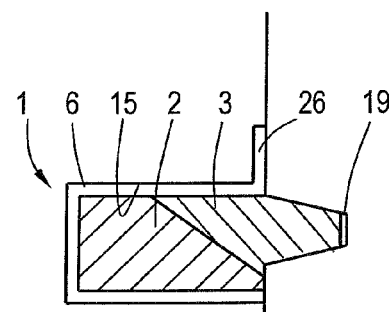

The first edge 14 is provided with an undercut 15 which accommodates the fastening member 1. The undercut 15 is a groove which extends parallel to the upper face of the first panel 13. The base portion 6 is fixed in the undercut 15. In non-activated condition of the fastening member 1 as shown in FIGS. 3a-b the activating portions 2 project from the undercut 15 beyond a first upper lip portion 16 of the first edge 14 located above the undercut 15 and extending substantially perpendicularly to the upper face of the first panel 13. FIGS. 3e-f illustrate the fastening member 1 in activated condition. In this case a second panel 17 having a second edge 18 is fastened to the first panel 13 in a direction perpendicularly to the upper faces of the panels 13, 17 through the fastening member 1. The second edge 18 extends between the upper face and lower face of the second panel 17.

In the fastened condition of the panels 13, 17 the first edge 14 and second edge 18 face to each other. In this embodiment the locking portion 3 is inserted in a locking region or groove 19 extending parallel to the second edge 18 and the upper face of the second panel 17. The activating portions 2 are displaced towards the first panel 13 by a downwards movement of the second panel 17, resulting in a movement of the locking portion 3 into the groove 19 of the second panel 17. In this case the part of the groove 19 to which the locking portion 3 is engaged forms the locking region of the second panel 17. More specifically, in this case the locking region comprises opposite walls of the groove 19 in order to fix the positions of the first panel 13 and second panel 17 with respect to each other in upward and downward direction. It can be seen in FIGS. 3a-f that the locking portion 3 and the groove 19 are tapered to achieve an appropriate fit between each other. The protrusion depth of the locking portion 3 in the groove 19 can be adapted by means of changing the dimensions of the levers 4 of the fastening member 1.

FIGS. 3c-d show an intermediate position of the second panel 17 with respect to the first panel 13 during a fastening movement. It can be seen that the activating portion 2 is displaced into the undercut 15 by the downward displacement of the second panel 17. The locking portion 3, however, is also still within the undercut 15 since the groove 19 is located still too high with respect to the locking portion 3 to receive the locking portion 3. This is possible by elastic deformation of the levers 4 of the fastening member 1.

In FIG. 3a-f it can be seen that a lower surface of the locking portion 3 and a corresponding surface of the groove 19 are inclined such that the second panel 17 can be decoupled from the first panel 13 relatively easy by an upwardly directed force on the second panel 17 at the second edge 18. The lower side of the locking portion 3 preferably has an inclination of 30-40° with respect to the upper surface of the first and second panels 13, 17, for example. The inclined lower surface of the locking portion 3 also facilitates decoupling of the second panel 17 with respect to the first panel 13 by means of an angling-out motion.

FIGS. 3a-f show that the activating portion 2 and the locking portion 3 at least partially overlap each other as seen along the first edge 14.

Figure 4:
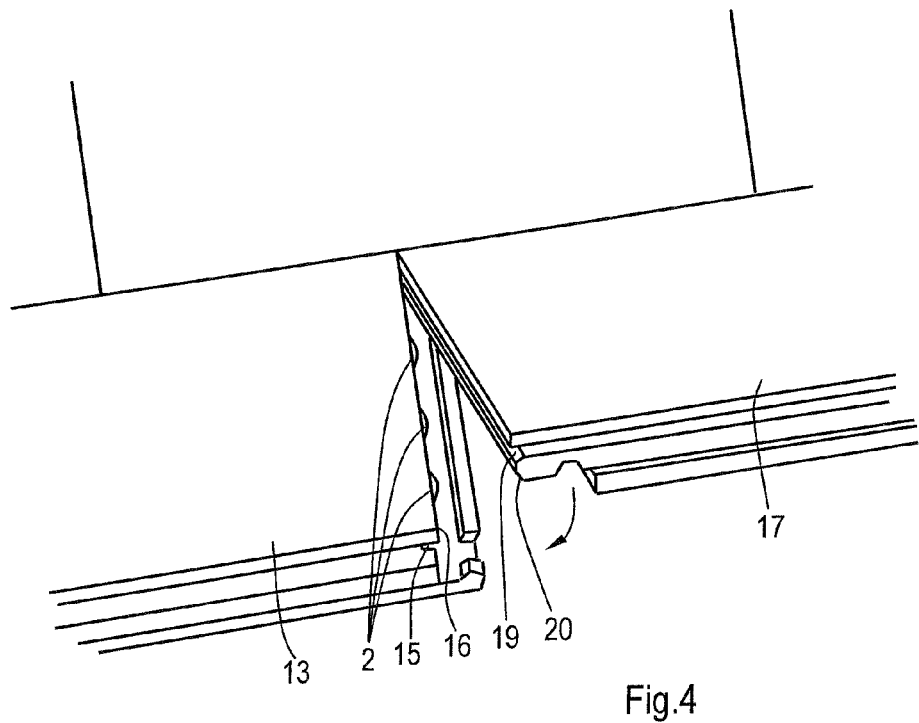
FIG. 4 is a perspective view of two panels just before fastening them to each other by means of the fastening member according to the invention.

In FIG. 4 the fastening by means of a folding down movement of the second panel 17 with respect to the first panel 13 is illustrated. The activating portions 2 still protruding from the undercut 15 in the first panel 13 can be seen. A lower edge portion 20 at the second edge 18 of the second panel 17 pushes the activating portions 2 in a direction from the second panel 17 to the first panel 13 into the undercut 15 and the locking portion 3 will be displaced from the undercut 15 into the groove 19 of the second panel 17. As a consequence, the first and second panels 13, 17 are fixed to each other in a direction perpendicularly to the upper faces thereof.

It is noted that in this fastening member the activating portions 2 and the locking portion 3 each only move in one direction upon fastening the first and second panels to each other. In the embodiments as shown above they move in opposite directions with respect to each other within a plane extending parallel to the upper surface of the first panel 13.

Figure 5A:
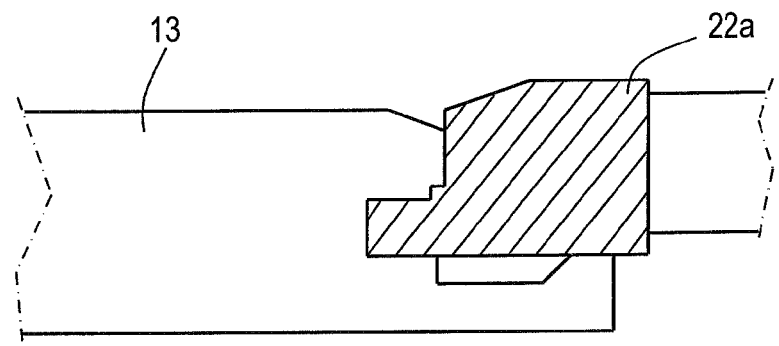
FIG. 5a is a cross-sectional view of a part of an embodiment of a first panel during a manufacturing step thereof and FIG. 5b is a similar view as FIG. 5a of the resulting first panel.
Figure 5B:
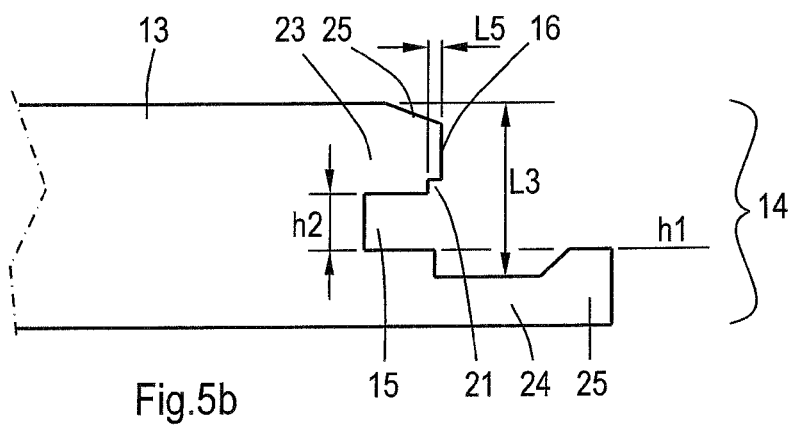

FIG. 5a illustrates a manufacturing step of the first panel 13. A large part of the profile of the first edge 14 is manufactured by a first milling device 22a. FIG. 5b shows the resulting first panel 13 having an undercut 15 in which the fastening member 1 can be accommodated; the width of the undercut 15 is indicated by h2. Comparing the shape of the base portions 6 of the embodiments of the fastening member 1 as shown in FIGS. 1a-1f with the shape of the undercut 15 of the first panel as shown in FIG. 5b reveals that the undercut 15 is shaped to fit the fastening member 1 therein. The first edge 14 is also provided with a small recess 21 extending parallel to the undercut 15 and disposed between the undercut 15 and the upper joint portion 16. The depth of the recess 21 is indicated by L5 in FIG. 5b.

Figure 5C:
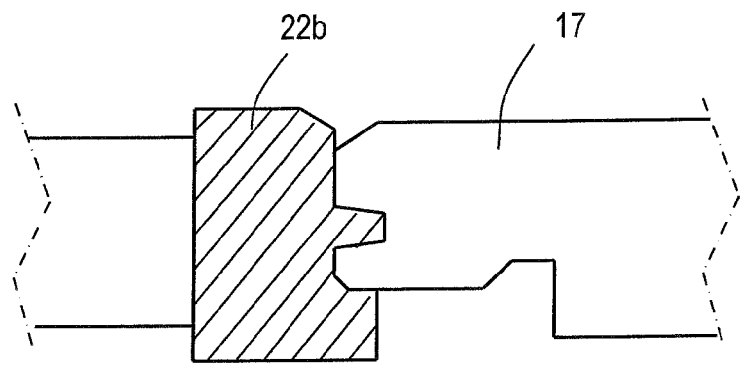
FIGS. 5c-d are similar views as FIG. 5a-b, respectively, but showing a manufacturing step of the second panel.
Figure 5D:
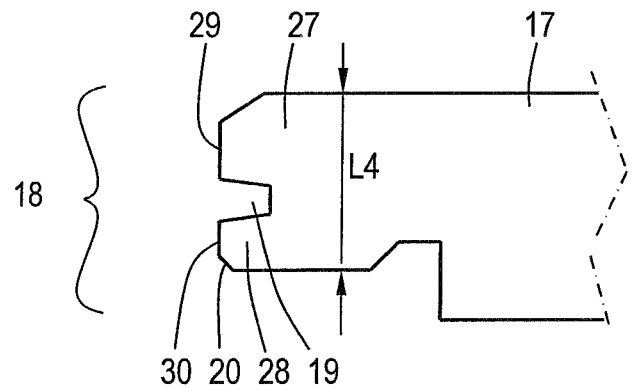

FIG. 5c illustrates a manufacturing step of the second panel 17. A large part of the profile of the second edge 18 is manufactured by a second milling device 22b. FIG. 5d shows the resulting second panel 17 having a locking region or groove 19 in which the locking portion 3 of the fastening member 1 can be engaged. The dimensions indicated by L3 in FIG. 5b and L4 in FIG. 5d are substantially the same such that the upper surfaces of the first and second panels 13, 17 are flush when the first and second panels 13, 17 are fastened to each other.

The first edge 14 of the first panel 13 has a first upper lip 23 and a first lower lip 24. In this embodiment at an extreme edge of the first panel 13 the upper surface thereof is lowered at the first upper lip 23, thus forming an inclined portion with respect to the upper face of the first panel 13 for forming a V-groove when the first and second panels 13, 17 are fixed to each other along the first and second edges 14, 18 thereof.

The first lower lip 24 extends beyond the first upper lip 23 as seen in outward direction of the first panel 13. An end portion of the first lower lip 24 is provided with a first lower lip projection 25 facing upwardly. In the embodiment as shown in FIG. 5b an upper surface of the first lower lip projection 25 lies at substantially a same level h1 as a lower wall of the undercut 15 so as to manufacture the undercut 15 and the first upper lip portion 16 by means of the first milling device 22a in a single step as illustrated in FIG. 5a. Milling the undercut 15 and the first upper lip portion 16 in a single step also provides the opportunity to achieve a high level of accuracy between the dimensions of the undercut 15 and the first upper lip portion 16. This means that when the fastening member 1 would be installed against a bottom of the undercut 15 the positions of the activating portions 2 and the locking portion 3 are accurately defined with respect to the location of the first upper lip portion 16.

Figure 5E:
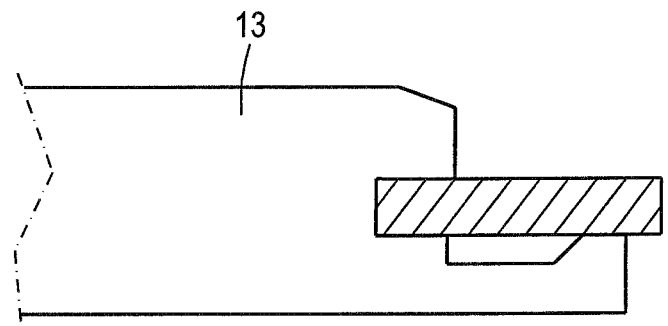
FIGS. 5e-f are similar views as FIG. 5a, respectively, but showing alternative manufacturing steps of the first panel.
Figure 5F:
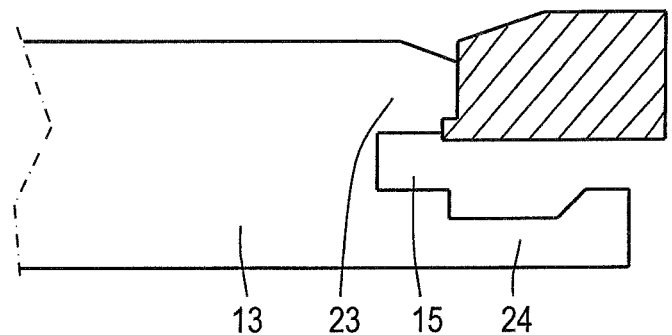

The undercut 15 and the first upper lip portion 16 can also be made in two steps, in case the pressure on the first panel 13 by the first milling device 22a becomes too high in a single manufacturing step. FIG. 5e illustrates a separate manufacturing step of the undercut 15 and FIG. 5f illustrates a separate manufacturing step of the first upper lip portion 16 and the recess 21. In a previous manufacturing step a large part of the side at the first edge 14 has already been removed and in the step as shown in FIG. 5f a remainder of the first panel 13 including possible remainders of laminate layers at the upper side of the first panel 13 is more accurately removed. In this case a high level of accuracy between the dimensions of the recess 21 and the location of the first upper lip portion 16 is achieved, whereas the positions of the bottom of the undercut 15 and the first upper lip portion 16 are less accurate with respect to each other due to different steps of milling. This means that when the fastening member 1 is installed in the undercut 15 such that a projection 26 of the base portion 6 which is complementary to the recess 21, fits in the recess 21, the positions of the activating portions 2 and the locking portion 3 are accurately defined with respect to the location of the first upper lip portion 16 as seen in a direction parallel to the upper surface of the first panel and perpendicular to the first edge 14.

As shown in FIG. 5d the second panel 17 comprises a second upper lip 27 and a second lower lip 28 extending above and below the groove 19, respectively. The second edge 18 is provided with a second upper lip portion 29 which extends above the groove 19 and a second lower lip portion 30 which extends below the groove 19. A lower surface of the second lower lip 28 is shaped in such a way that in the fastened condition of the first and second panels 13, 17 it fits to the upper surface of the first lower lip 24. Due to the shapes of the edges 14, 18 of the first and second panels 13, 17 the panels are also fastened in a direction parallel to the upper faces of the panels 13, 17 and perpendicularly to their respective edges 14, 18, in other words in substantially horizontal direction. In a fastened condition the first upper lip portion 16 is in contact with the second upper lip portion 29. The first and second panels 13, 17 are pressed to each other due to the shapes of the upper surface of the projection 25 of the first lower lip 24 and the lower surface of the second lower lip 28 of the second panel 17.

The second lower lip portion 30 is shaped such that during a downwards movement of the second panel 17 with respect to the first panel 17 it stays in contact with the activating portion 2 as shown in FIG. 3c-f. In practice this means that the second lower lip portion 30 extends substantially perpendicularly to the upper face of the second panel 17 just below the groove 19 and inclines inwardly to the second panel 17 further away from the groove 19. The inclined portion of the second lower lip portion 30 coincides with the lower edge portion 20.

The fastening member 1 is located in the undercut 15 such that before fastening the first and second panels 13, 17 to each other the activating portions 2 project beyond the first upper lip portion 16 as seen in outward direction of the first panel 13 (indicated by distance L1 in FIG. 2a) whereas the locking portion 3 is substantially flush with the first upper lip portion 16 or located further inside of the undercut 15, see FIG. 2a.

The dimensions of the width of the undercut 15 as indicate by h2 in FIG. 5b and the height of the base portion 6 as indicated by h3 in FIG. 2c are selected such that the base portion 6 is engaged to the first panel 13 by means of clamping. It is also possible to provide a part of the base portion 6 which is in direct contact with the first panel 13 with projections that increase the resistance between the base portion 6 and the first panel 13. The height of the locking portion 3 and the activating portions 2 are smaller than the height h2 of the undercut 15 such that they can move within the undercut 15 without contacting the walls thereof, see FIG. 2d. In this Fig. the free distance between the activating portions 2 and the locking portion 3 on the one hand and the walls of the undercut 15 on the other hand are indicated by h4 and h5. The free distances h4 and h5 avoid friction between the locking portion 3 and the activating portions 2 on the one hand and the first panel 13 on the other hand such that a force exerted on the activating portions 2 is substantially entirely converted to a force of the locking portion 3 onto the second panel 17.

Figure 6A:
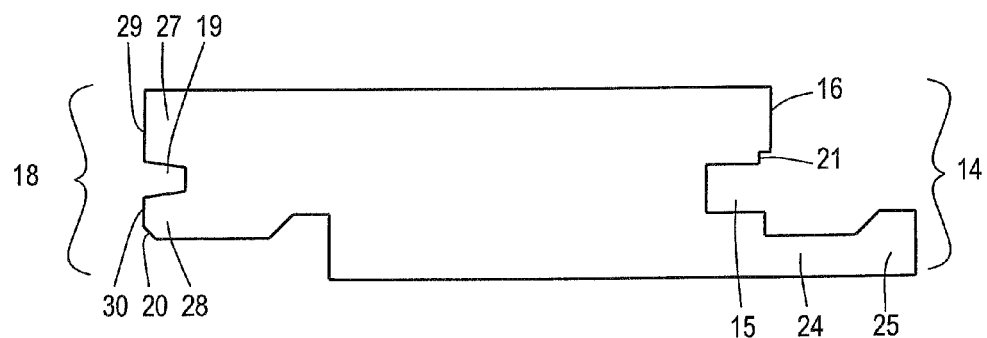
FIG. 6a is a cross-sectional view of an embodiment of a panel having a first edge and a second edge.
Figure 6B:
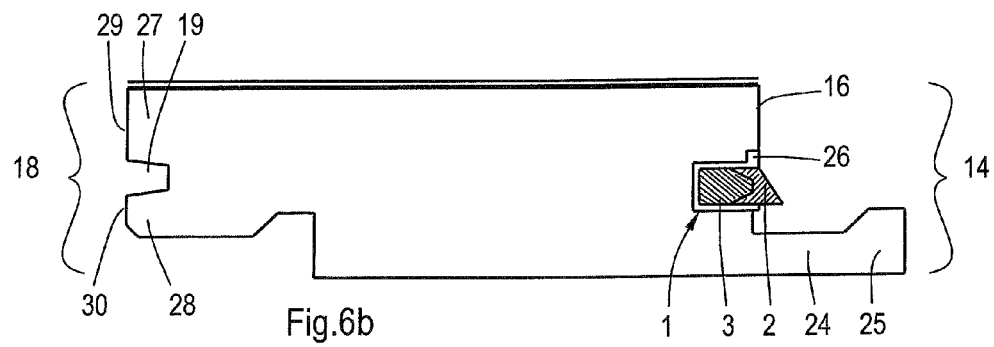
FIG. 6b is a similar view as FIG. 6a showing the panel including the fastening member and FIG. 6c is a plan view of the embodiment of FIGS. 6a-b.
Figure 6C:
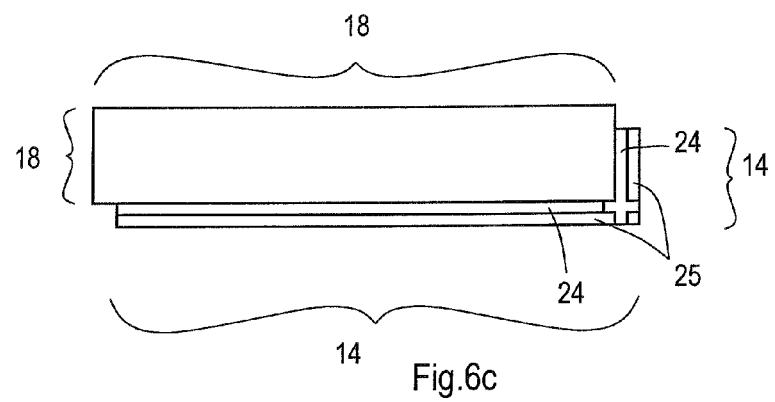

FIGS. 6a-b show cross-sectional views of an embodiment of a panel having a first edge 14 and a second edge 18. The shapes of the first and second edges 14, 18 are similar to those shown in FIG. 5a-5f and the same reference signs are used to indicate corresponding parts. As shown in FIG. 6b the undercut 15 in the first edge 14 accommodates the fastening member 1. FIG. 6c shows a plan view of the embodiment of the panel as shown in FIGS. 6a-b. As seen from above the panel has a rectangular shape and includes two first edges 14 at a long side and a short side of the panel and two second edges 18 at opposite sides thereof.

Figure 7A:
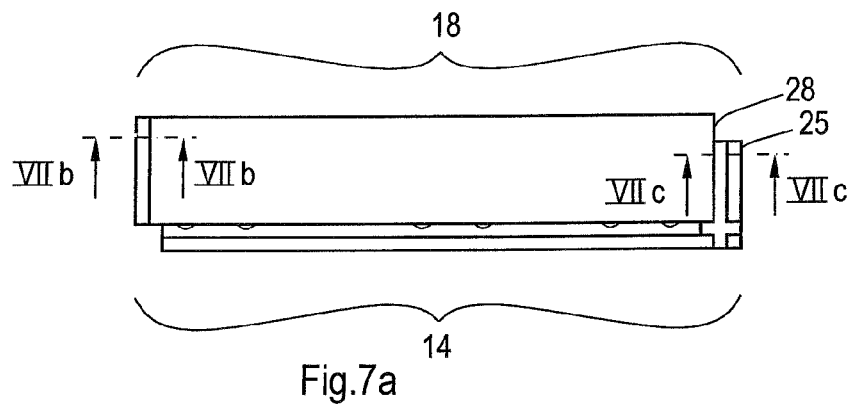
FIG. 7a is a similar view as FIG. 6c showing an alternative embodiment of a panel.
Figure 7B:
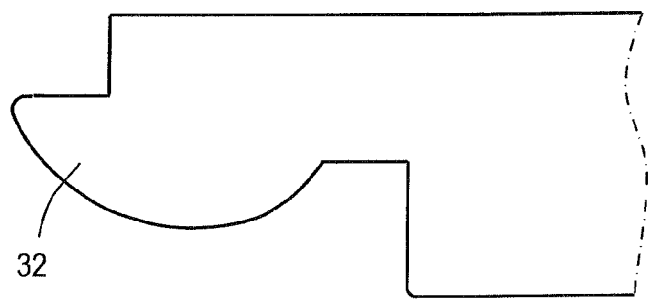
FIGS. 7b-c are sectional views along the lines VIIb-VIIb and VIIc-VIIc in FIG. 7a, respectively.
Figure 7C:
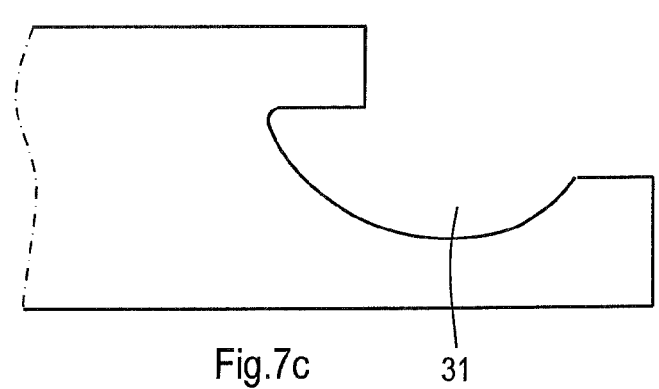

FIGS. 7a-c show an alternative embodiment of a panel of which opposite short sides comprise a groove 31 and a tongue 32, respectively, such that the short sides of two similar panels can be fixed to each other by angling the tongue 32 into the groove 31. The opposite long sides of the panel comprise a first edge 14 including three fastening members 1 as described hereinbefore and a second edge 18.

Figure 8A:
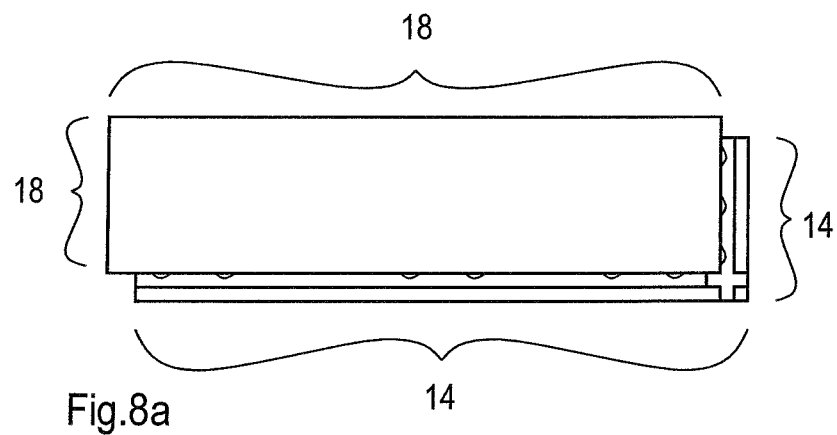
FIGS. 8a-c are similar views as FIG. 6c of alternative embodiments of the panel.
Figure 8B:
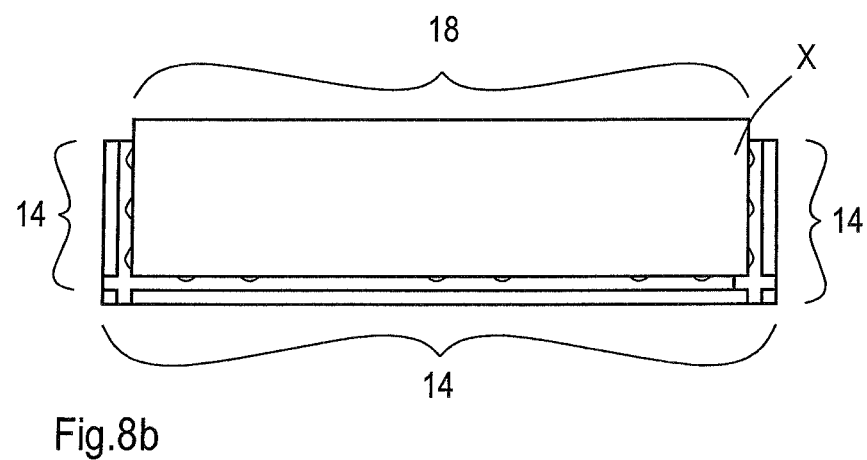
Figure 8C:
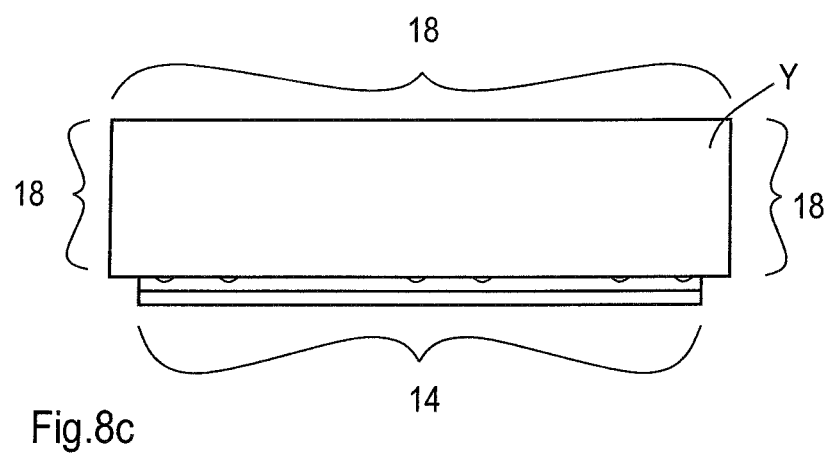

FIGS. 8a-c show several embodiments of a panel including fastening members 1. The embodiment according to FIG. 8a is similar to that shown in FIG. 6c; the panel according to FIG. 8b has two short sides including first edges 14, one long side having a first edge 14 and an opposite long side having a second edge 18; the panel according to FIG. 8c has two short sides including second edges 18, one long side having a first edge 14 and an opposite long side having a second edge 18.

The different configurations of the panels as shown in FIGS. 8a-c can be combined in different ways upon installing a floor.

Figure 9A:
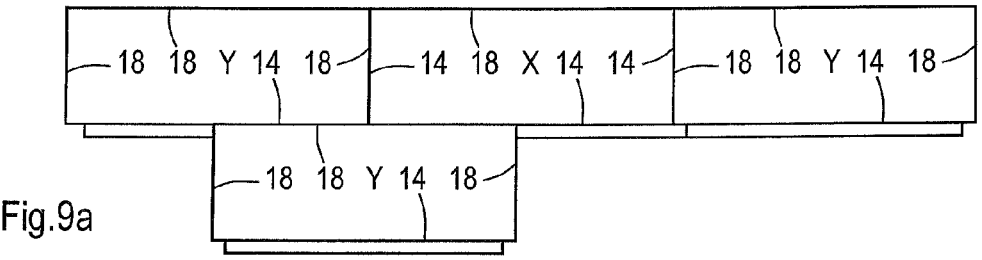
FIGS. 9a-b are plan views of different combinations of panels which form a part of a floor.
Figure 9B:
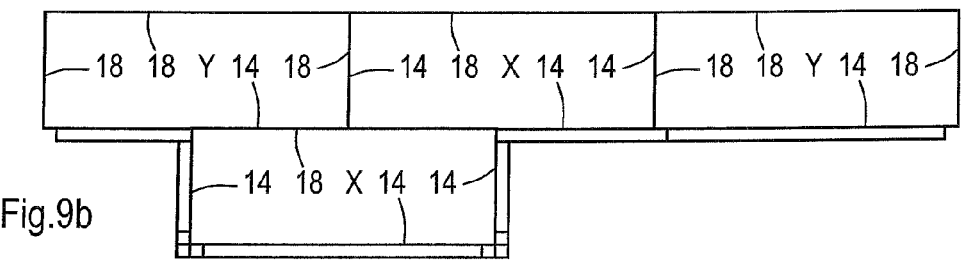

The embodiment of FIG. 8b is indicated by an X-type panel and the embodiment of FIG. 8c is indicated by a Y-type panel. FIGS. 9a-b illustrate examples of combining X- and Y-type panels according to embodiments as shown in FIGS. 8b and 8c.

Figure 10:
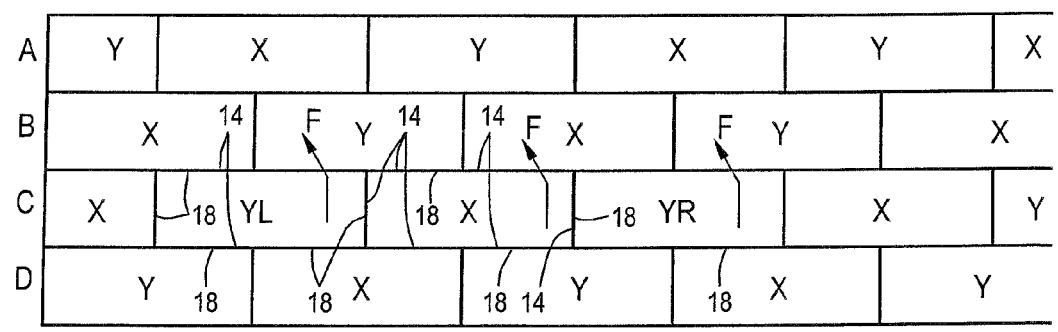
FIG. 10 is a similar view as FIGS. 9a-b of a larger floor part.

In practice it is desired to be able to take a panel out of a floor without the necessity of first removing a plurality of panels from an edge of the floor up to the intended panel. This can be achieved by applying panels having the fastening member of the set of panels. FIG. 10 shows a floor comprising rows A-D and illustrates how an X type panel and a Y type panel can be taken out of the row C of the floor. In case of a Y type panel the short sides and one long side thereof have three second edges 18 such that the Y type panel can be lifted at the long side with respect to the adjacent panels in row B and angled out with respect to the adjacent panels in row D at the first edge 14 of the Y type panel. In case of an X type panel in row C of the floor, first the adjacent Y type panels disposed at both short sides of the X type panel, indicated by YR and YL in FIG. 10, have to be removed before the X type panel can be lifted at its second edge 18 and angled out at its long first edge 14.

Figure 11:
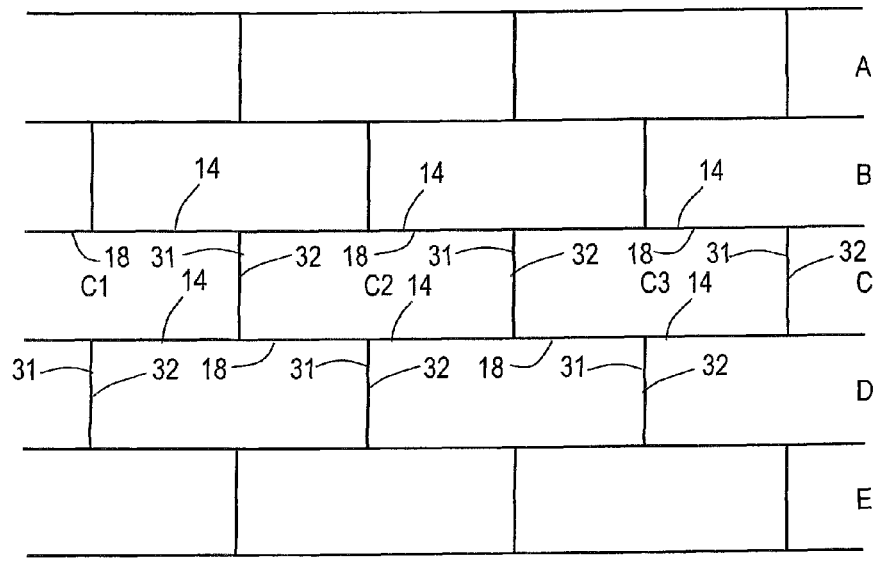
FIG. 11 is a similar view as FIG. 10 on a larger scale, illustrating a floor made of panels as shown in FIGS. 7a-c.

FIG. 11 shows a floor comprising panel rows A-E. The panels applied in this floor embodiment are of a type as shown in FIG. 7a. This means that the short sides of the panels are provided with an angling-angling coupling system and the long sides are provided by the fastening member of the set of panels. Focussing on row C it may be desired, for example, to take out the panel indicated by C2. This can be achieved by exerting an upwardly directed force on the long sides of the panels in row C including second edges 18. The entire row C can be angled out with respect to row D about the long sides including the first edges 14. When placing back the row of panels C1-C3 the panels C1-C3 are first coupled to each other along their respective short sides including the tongues 32 and grooves 31; then the second edges 18 of the panels in row D are fastened to the respective first edges 14 of the panels in the row C by placing the first lower lips 24 of the panels of row C below the second lower lips 28 at the second edges 18 of the panels in row D and displacing the panels in row D downwardly such that rows C and D are fastened to each other. The panels in row C can subsequently be fastened to the panels in row B by displacing the panels in row C at their sides including the second edges 18 downwardly such that the fastening member 1 at the first edges 14 of the panels in row B engage to the groove 19 at the second edges 18 of the panels in row C.

Figure 12:
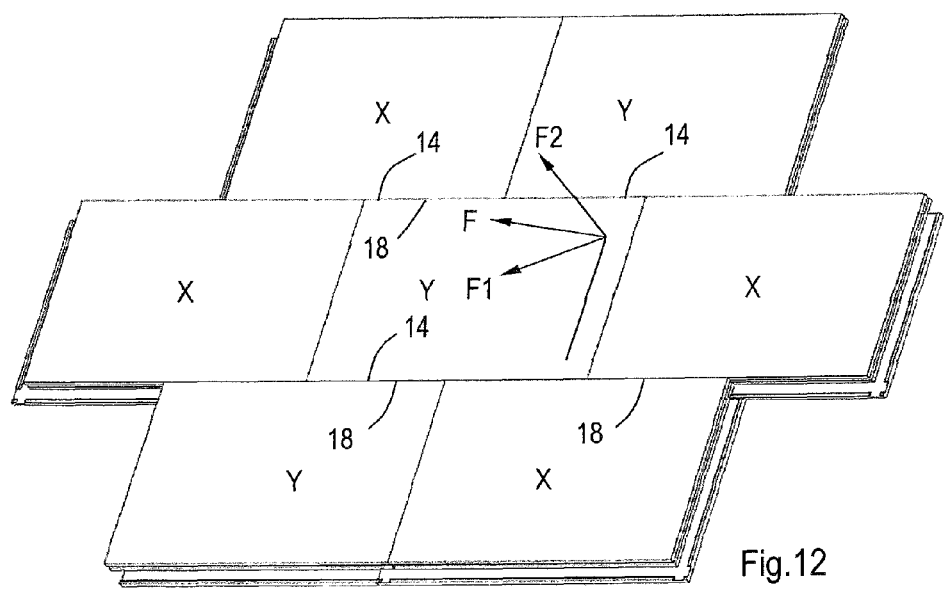
FIG. 12 is a perspective view of an alternative configuration of a floor part as shown in FIGS. 9a-b.

FIG. 12 illustrates that the force exerted on a Y type panel at the second edge 18 thereof, in order to take it out, should be directed transversely to one of the panels, but not necessarily perpendicularly thereto. Such a force on a panel can be created by engaging a suction cup onto the panel and pull the panel upwardly.

Figure 14:
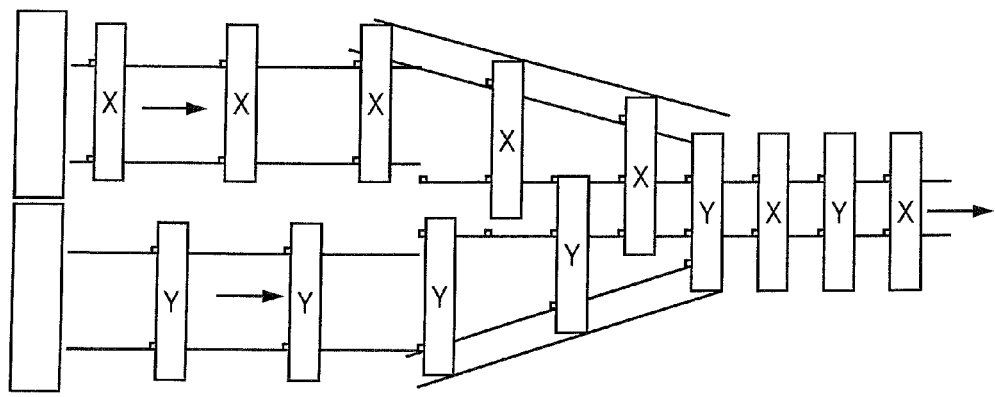
FIGS. 14 and 15 are illustrative views of packaging different panel types.
Figure 15:
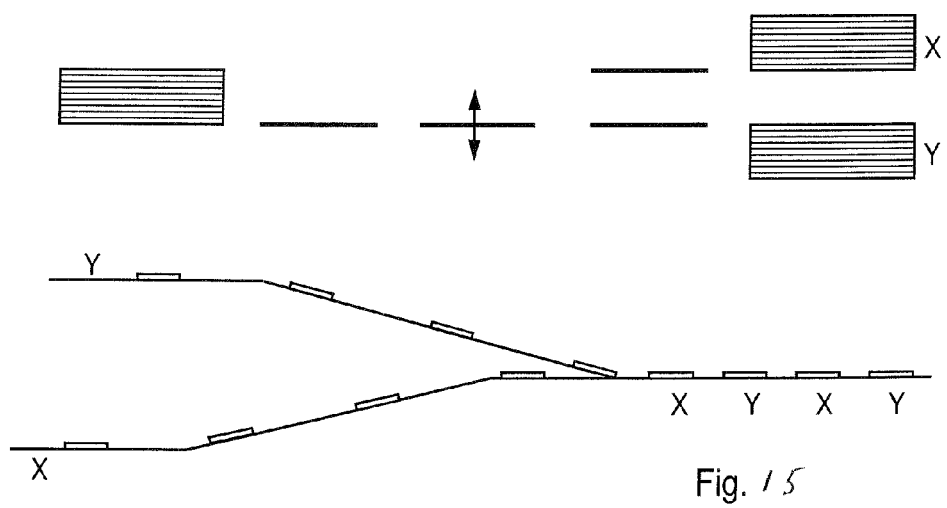

After manufacturing different types of panels, e.g. X type and Y type panels, the resulting panels should be packaged such that a package of panels comprises different types of panels. Two alternative packaging systems are illustrated in FIGS. 14 and 15. In FIG. 14 X type panels and Y type panels are supplied by parallel conveyors. The distance between two successive X type panels and between two successive Y type panels is such that at a certain location the panels on the two parallel conveyors can be moved to each other in transverse direction of the conveying direction of the parallel conveyors, such that a series of alternating X and Y type panels arises on a single downstream conveyor. FIG. 15 shows an alternative packaging system in which the conveyors for supplying X and Y type panels merge to a single downstream conveyor, wherein the two supplying conveyors converge to each other in height direction.

From the foregoing, it will be clear that an aspect of the invention provides an appropriate fastening member for fastening two panels to each other.

The invention is not limited to the embodiments shown in the drawings and described hereinbefore, which may be varied in different manners within the scope of the claims and their technical equivalents. For example, it is possible to apply the fastening member for horizontal fixing of two adjacent panels, which fastening can be achieved by moving the edges of the panels to each other within the planes of the panels.

The invention claimed is:

1. A set of panels, comprising
a first panel having a first edge including an undercut which accommodates a fastening member,
a second panel having a second edge including a locking region, wherein the first and second edges are positioned adjacent to each other when the panels are fastened to each other with the fastening member,
the fastening member comprising a displaceable activating portion and a locking portion which is displaceable with respect to the first panel upon displacement of the activating portion in opposite direction of the displacement of the activating portion such that the locking portion is inserted in the locking region of the second panel when the panels are fastened to each other with the fastening member,
wherein the activating portion is configured to be contacted by the second panel upon moving the second panel and the first panel with respect to each other to a fastened condition and wherein the locking portion is configured to fasten the first and second panels with respect to each other at least perpendicularly to the direction of displacement of the locking portion,
wherein the activating portion is spaced from the locking portion in a direction substantially parallel to the first edge.

2. The set of panels according to claim 1, wherein the activating portion and the locking portion at least partially overlap each other as seen along the first edge.

3. The set of panels according to claim 1, wherein the locking portion is displaceable in a direction substantially parallel to the upper face of the first panel and substantially perpendicular to the first edge.

4. The set of panels according to claim 1, wherein the locking portion is configured to rotate with respect to the first panel about a pivoting axis upon displacement of the activating portion, wherein the pivoting axis extends transversely with respect to an upper face of the first panel.

5. The set of panels according to one claim 1, wherein the activating portion is configured to rotate with respect to the first panel.

6. The set of panels according to claim 4, wherein the fastening member comprises a lever which is pivotable about the pivoting axis, wherein the locking portion and the activating portion are provided on the lever at opposite sides of the pivoting axis.

7. The set of panels according to claim 1, wherein the fastening member comprises a resiliency for temporarily building up a spring force on the locking portion upon displacement of the activating portion.

8. The set of panels according to claim 1, wherein the fastening member comprises a lever with a pivoting axis and the activating portion is provided on the lever at a distance from the pivoting axis, and wherein an opposite portion of the lever slidably contacts the locking portion which locking portion is translatably connected to the first panel.

* * * * *